10

United States Patent Office 3,389,097
Patented June 18, 1968

3,389,097
EXPANDABLE POLYMERS
Alvin R. Ingram and Harold A. Wright, Murrysville, Pa.,
assignors to Koppers Company, Inc., a corporation of
Delaware
Filed June 26, 1964, Ser. No. 378,177
9 Claims. (Cl. 260—2.5)

ABSTRACT OF THE DISCLOSURE

The invention concerns the preparation of foamable vinyl aromatic polymers by polymerizing the monomers in an aqueous suspension into which a fatty acid bis-amide is added during an intermediate stage of polymerization.

---

Figure 1:
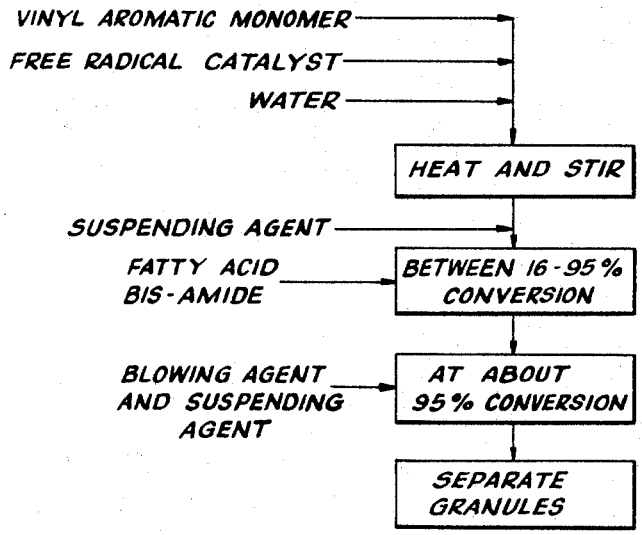

This invention relates generally to expandable thermoplastic material and, more particularly, to improved expandable thermoplastic polymer granules which exhibit a strong antilumping property during pre-expansion and which cool rapidly when molded into a structural unit.

The making of low-density, cellular, shaped, plastic articles from expandable granules or beans of thermoplastic material is well-known. Such granules generally contain a blowing agent which boils below the softening point of the thermoplastic material which will cause the granules to expand when they are subject to heat. These granules are placed in a mold cavity which defines the shape of the desired finished article. The particles are heated, for example, by steam, or other suitable heating media injected under pressure into the mold cavity to heat the granules above their softening point, whereupon the granules expand to fill the mold cavity and fuse together.

The granules can be either placed directly into the mold or they can be pre-expanded before being placed in the mold as, for example, as described in United States Patent No. 3,023,175.

Thermoplastic expandable polymer granules have worked well in the above molding process to form a wide variety of articles. However, they have shown certain disadvantages. During the pre-expansion process, the granules have a tendency to stick together and form lumps which renders the granules unsuitable for molding. To avoid lumping problems a lubricant has been added to the surface of the granules, but the type and amount of lubricant has to be carefully controlled or the granules will not adhere together when molded. Also, after the granules have been heated in the mold to form the desired article, the article must be cooled for a relatively long period of time, depending upon the thickness of the article, before it can be removed from the mold in a self supporting state to retain its shape outside the mold. Foamed plastic has good insulation qualities, so the cooling time for the article consumes a large part of the molding cycle and greatly restricts the number of articles that can be produced from a mold in a given period of time.

The cooling time is not appreciably shortened by applying cooling media to the surface of the article or to the mold surface since the heat transfer through the article is extremely slow. This low heat transfer rate is in fact one of the properties which makes these articles useful, for example, for insulation. If the articles are removed from the mold too soon, the combination of the softness of the thermoplastic material and the pressure due to the hot interior of the article will cause the article to bulge and thereafter not have the desired shape.

Surprisingly, we htve found the expandable polymeric granules will not lump during pre-expansion and the cooling time of the molded article that is made from the granules is drastically reduced by the addition of fatty acid bis-amides to the monomer or mixtures thereof at the proper stage of the polymerization.

In accordance with this invention, a vinyl aromatic monomer either alone or in admixture with other polymerizable monomers copolymerizable therewith is polymerized in an aqueous suspension in the presence of a catalytic amount of a free radical initiator until about between 16 and 95 percent conversion of the vinyl monomer to polymer has occurred; then, based upon the weight of monomer, there is added from about 0.1–0.75 percent by weight of a bis-amide having the general formula:

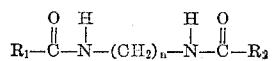

where $R_1$ and $R_2$ are alkyl or alkenyl groups each having from 7–21 carbon atoms and where $n$ is an integer of from 1–6 and the polymerization is completed. The polymer is rendered expandable by incorporating therein 5–10 percent of a blowing agent.

Polymerizing monomers in an aqueous suspension is a well-known operation. The monomer or mixture of monomers and a free radical initiator in the form of an oil phase are admixed with water and heated. The mixture is stirred or agitated so that the oil phase is in the form of small individual droplets. After the polymerization has progressed to a certain point, which varies depending upon the nature of the monomer or monomers, the droplets tend to become sticky so that stirring alone is insufficient to keep the droplets from coalescing. It is, therefore, necessary to have a suspending or stabilizing agent present in the polymerization mixture. Examples of suitable stabilizing agents are polyvinyl alcohol and hydroxyethyl cellulose, etc.

The temperature for the polymerization must be high enough so that the polymerization occurs at a reasonable rate, depending upon the catalyst system used, with the preferred temperature range being between about 70° and 120° C.

Typical free radical initiators are oil soluble free radical catalysts, such as benzoyl peroxide, t-butyl perbenzoate, lauroyl peroxide and azobisisobutyronitrile.

In accordance with this invention when the polymerization has reached a point between about 16 and 95 percent conversion of the vinyl monomer, 0.1 to 0.75 percent, based upon the weight of the monomer, of fatty acid bis-amide is added to the suspension. Quantities of fatty acid bis-amide smaller than 0.1% have no appreciable effect in reducing the lumping tendency of the beads. Quantities over 0.75% adversely affect fusion of the beads when they are molded. The bis-amide can be added to the polymerization mixture as a finely ground powder or it can be added to a small amount of styrene after which the styrene containing the bis-amide in approximately 20 to 40 percent by weight is added to the polymerization mixture.

The time of addition of the bis-amide is critical. If the bis-amide is added too soon or before approximately 16 percent conversion of the vinyl monomer is reached, the expandable granules do not have the desired antilumping property. In fact if the bis-amide is added to the monomer prior to the polymerization of the monomer, a water in monomer emulsion that is very difficult to break forms. Unless the emulsion can be broken the mixture must be discarded since any attempt to polymerize the emulsion would result in a large polymerized mass rather than individual granules.

On the other hand if the bis-amide be added after 95 percent conversion of the monomer has occurred, the bis-amide does not become effectively dispersed within the polymer granules so that fast cooling properties are not obtained and, although the granules do show a reduced lumping tendency during pre-expansion when compared with the products produced heretofore, the existence of a large amount of bis-amide on the surface of the granules causes poor fusion of the granules when the granules are molded. Advantageously, the bis-amide is introduced into the polymerization mixture just after the addition of the suspending agent at about 40 percent conversion of the vinyl monomer or from about 75-95 percent conversion of the vinyl monomer. A delay in adding the agent beyond the time just after when the suspending agent is added but before the bead identity point is reached (75-80% conversion) has a tendency to disrupt the stability of certain suspension systems such as a suspension using hydroxyethyl cellulose and tends to cause the granules to flatten. Therefore, if it is desired to produce spherical granules, then the addition should be made to correspond with one of the two above mentioned periods although the somewhat flatter shape of the granules when the addition of the bis-amide is made between about 50 and 75 percent conversion is not seen as a disadvantage since the product granules give equally good results and have the advantage of not being a hazard to operating personnel should they be spilled on the floor during subsequent operations.

The fatty acid bis-amides which are useful in the practice of our invention include aliphatic amides of fatty acids having the general formula:

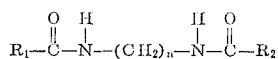

where $R_1$ and $R_2$ are alkyl or alkenyl groups having from 7-21 carbon atoms and $n$ is an integer from 1-6 as well as mixtures thereof. $R_1$ and $R_2$ can be either identical or different. Examples of these compounds are methylene-bis-stearamide, ethylene-bis-stearamide, ethylene-bis-palmitamide, 1,3-propane-bis-stearamide, 1,6-hexane-bis-lauramide, 1,6-hexane-bis-stearamide, ethylene-bis-caprylamide, ethylene - bis - docosanoamide, ethylene - bis-oleamide, ethylene-bis-erucylamide, etc.

The blowing agent may be incorporated in the polymer particles at the desired time, for example, during polymerization or after the polymerization has been completed. Preferred blowing agents include aliphatic hydrocarbons containing from 1-7 carbon atoms in the molecule, for example, methane, ethane, propane, butane, pentane, hexane, heptane, cyclohexane and their halogenated derivatives which boil below 95° C.

Figure 2:
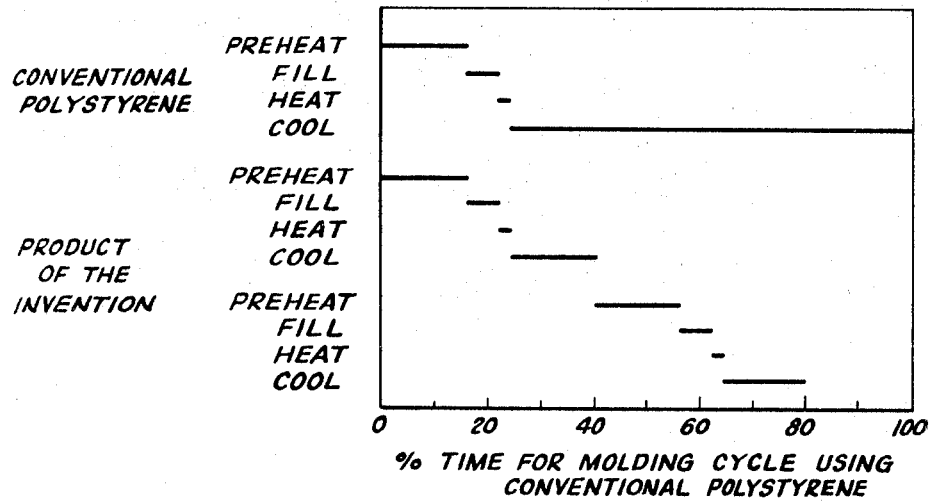

FIGURE 1 illustrates, by flow diagram, a process for producing the composition of the invention, and FIGURE 2 compares, by chart, a molding cycle using a conventional expandable polystyrene and the product of the invention.

Our invention is further illustrated by but not limited to the following examples.

EXAMPLE I

To a 2500 gallon reactor there was charged consecutively 100 parts of styrene (10,000 pounds), 5 parts of low molecular weight polystyrene resin (softening point 122° C.; viscosity of 30% solution in toluene 2.3 centistokes), 0.47 part of benzoyl peroxide, 0.10 part of t-butyl perbenzoate, 102 parts of water and 0.10 part tetrasodium pyrophosphate. The mixture was stirred by a three-bladed impeller at a speed of 65 r.p.m., heated to 92° C. and maintained at that temperature. Approximately 80 minutes after reaching 92° C., 0.10 part of hydroxyethyl cellulose was added and the impeller speed was increased to 80 r.p.m. Between 5 and 10 minutes after the addition of the hydroxyethyl cellulose, when it was determined by sample that approximately 40% of the monomer had been converted to polymer, there was added a slurry of 0.40 part of ethylene-bis-stearamide contained in styrene (prepared by stirring 0.4 part of amide with 1.5 part of styrene) and the temperature was continued to be maintained at 92° C. for an additional 360 minutes. The particles were then impregnated with blowing agent by adding 0.20 part of polyoxyethylene sorbitan monolaurate as a stabilizer for the blowing agent and 8.5 parts of n-pentane to the polymerization mixture. The polymerization was completed by raising the temperature to 115° C. and maintained there for 420 minutes. Thereafter, the mixture was cooled to room temperature and the granules removed, washed and dried.

EXAMPLE II

An aliquot of the granules prepared in Example I were pre-expanded in a Rodman pre-expander, U.S. 3,023,175, to a density of 0.98 p.c.f. The granules' anti-lumping characteristics were good (1.0%). Polystyrene granules prepared as in Example I but without the addition of ethylene-bis-stearamide pre-expanded to the same density but produced an excessive amount (6.0%) of lumps.

Portions of the granules so pre-expanded were molded into 20 x 20 x 12" foam blocks by placing the granules in a conventional mold consisting of a porous mold cavity surrounded by a steam chest. Steam at 30 p.s.i.g. was introduced into the steam chest to cause the granules to expand and fuse together. After the steam was shut off cooling water was circulated through the steam chest. (As used hereinafter the term "foam cooling time" is defined as the time it is necessary to circulate the cooling water at 30° C. through the steam chest before the block is self supporting and will not expand when it is removed from the mold cavity.) Blocks molded from these granules were self supporting and could be removed from the mold after 1.5 to 2 minutes foam cooling time.

EXAMPLE III

Example II was repeated except that instead of using beads prepared in Example I a readily available commercial product F40 Dylite® expandable polystyrene was employed. 20 x 20 x 12" blocks molded from the commercial product required 20-30 minutes foam cool time.

EXAMPLE IV

Example I was repeated except that 0.30 part of ethylene-bis-stearamide was added to the polymerization mixture at approximately 40% conversion in the form of a finely divided dry powder instead of as a slurry in styrene. The product polymer granules when processed according to Example II gave a foam cool time of 7 minutes when molded into a 20 x 20 x 12" block and had good anti-lumping and fusion characteristics.

EXAMPLE V

Example I was repeated except that 0.30 part of a 50-50 mixture of ethylene-bis-palmitamide and ethylene-bis-stearamide in the form of slurry in 1.5 parts of styrene was added to the polymerization mixture at approximately 40% conversion in place of the ethylene-bis-stearamide. Blocks molded from the product polymer granules gave a foam cool time of 5 minutes when molded in accordance with the procedure set forth in Example II.

EXAMPLE VI

Example I was repeated except that a slurry of 0.40 part of 1,6-hexane-bis-lauramide in 1.5 parts styrene was added to the polymeriztaion mixture in place of the ethylene-bis-stearamide at approximately 40% conversion. Blocks molded from the product polymer granules gave a foam cool time of 3-4 minutes when molded in accordance with the procedure set forth in Example II.

EXAMPLE VII

To a 100 gallon Pfaudler kettle there were charged in sequence 102 parts of water, 0.10 part of tetrasodium pyrophosphate, 105 parts of styrene, 0.37 part benzoyl peroxide, and 0.10 part of t-butylperbenzoate. The polymerization mixture was stirred with a three-bladed impeller at an impeller speed of 80 r.p.m., heated to 92° C. and maintained at that temperature. 45 minutes after the polymerization mixture reached 92° C. or at approximately 30% conversion as determined by sample 0.30 part of methylene-bis-stearamide, in the form of a finely divided dry powder, was added to the suspension. The hydroxyethyl cellulose (0.10 part) was added 30 minutes later and the agitator speed increased to 110 r.p.m. and the polymerization was continued at 92° C. for an additional 320 minutes. The polymer particles were then impregnated with blowing agent by adding 0.20 part of polyoxyethylene sorbitan-monolaurate as a stabilizer for the blowing agent and 8.0 parts of pentane. The temperature was then raised to 115° C. for 360 minutes to complete the polymerization. The product polymer granules were recovered from the polymerization and molded in accordance with the procedure set forth in Example II. The granules had good antilumping properties (1.5% lumps) when pre-expanded, good fusion properties on molding and the blocks had a foam cool time of 2.5 minutes.

EXAMPLE VIII

To a 100 gallon Pfaudler kettle there were charged in sequence 102 parts of water, 0.10 part of tetrasodium pyrophosphate, 105 parts of styrene, 0.30 part of benzoyl peroxide, and 0.15 part of t-butyl perbenzoate. The polymerization mixture was stirred at 80 r.p.m., heated to 92° C. and maintained at that temperature. After approximately 70 minutes at 92° C. 0.10 part of hydroxyethyl cellulose was added and the impeller speed increased to 110 r.p.m. The polymerization was continued for an additional 300 minutes or until approximately 90–95% conversion as determined by sample when 0.20 part of polyoxyethylene sorbitan monolaurate was added. Immediately thereafter 0.30 part of methylene-bis-stearamide was added in the form of a dry powder. The addition of 8.0 parts of pentane was then begun. After the pentane addition was completed the temperature of the polymerization mixture was raised to 115° C. and maintained at that temperature for 6 hours in order to complete the polymerization. The polymer granules were recovered from the polymerization mixture and molded in accordance with the procedure set forth in Example II. The product granules possessed good antilumping (1.2% lumps) properties on pre-expansion. The molded block had a foam cool time of 4–5 minutes and good fusion.

EXAMPLE IX

Example VIII was repeated except that 0.25 part of ethylene-bis-oleamide in place of the methylene-bis-stearamide was added to the polymerization mixture of about 90% conversion. Blocks molded from the product polymer granules gave a foam cool time of 3–4 minutes when molded in accordance with the procedure set forth in Example II.

EXAMPLE X

Example VIII was repeated except that 0.4 part of ethylene-bis-caprylamide in place of the methylene-bis-stearamide was added to the polymerization mixture at approximately 90% conversion. Blocks molded from the product polymer granules gave a foam cool time of 2–3 minutes when molded in accordance with the procedure set forth in Example II.

EXAMPLE XI

Example VIII was repeated except that 0.4 part of ethylene-bis-docosanoamide in place of the methylene-bis-stearamide was added to the polymerization mixture at approximately 90% conversion. Blocks molded from the product polymer granules gave a foam cool time of 5 minutes when molded in accordance with Example II.

EXAMPLE XII

Example VIII was repeated except that no methylene-bis-stearamide was added to the polymerization mixture. After the product polymer granules were recovered from the polymerization and air dried they were mechanically blended with 0.3 part of methylene-bis-stearamide and then molded in accordance with the procedure set forth in Example II. Lumping of the granules was satisfactory on pre-expansion (1.5%) but the mold cooling time of blocks molded from the beads was from 16–24 minutes and the fusion of the block was poor.

EXXAMPLE XIII

To a 2-liter resin kettle there was charged 500 grams of water and 500 grams of styrene containing 1.5 grams of benzoyl peroxide and 0.75 grams of t-butyl perbenzoate dissolved therein. The mixture was stirred and heated at 92° C. As a suspending agent 42.5 grams of a 2% solution of polyvinyl alcohol in water was added after 80 minutes at 92° C. Approximately 5 minutes after the addition of the suspending agent 2.5 grams of ethylene-bis-stearamide in the form of a 25% solid slurry in 10 grams of styrene was added to the polymerization mixture and the heating and stirring was continued for 300 minutes. A 160 gram portion of the polymerization suspension was transferred to a 12 oz. bottle to which was added 40 ml. of a 2% solution of polyoxyethylene sorbitan monolaurate and 11.5 ml. of n-pentane. The bottle was capped and rotated end over end for 240 minutes at 115° C. The polymer granules were removed from the cooled slurry, washed and dried.

EXAMPLE XIV

The granules prepared in Example XIII were pre-expanded to a density of 1.05 p.c.f. and molded into a 1-inch thick ring having an 8-inch diameter using steam. The foam cooling time of the ring was 0.8 minute compared to 1.6 minutes for a ring molded from beads prepared using the above procedure without the ethylene-bis-stearamide.

EXAMPLE XV

The procedure of Example XIII was repeated except that the ethylene-bis-stearamide addition was omitted. A ring molded from the product polymer granules in accordance with the procedure set forth in Example XIV had a foam cooling time of 1.6 inches.

EXAMPLE XVI

To a 100 gallon Pfaudler kettle there was charged in sequence 102 parts of water, 0.1 part of tetrasodium pyrophosphate, 105 parts of styrene, 0.37 part benzoyl peroxide and 0.10 part of t-butylperbenzoate. The polymerization was stirred at an impeller speed of 80 r.p.m. heated to 92° C. 45 minutes after the polymerization reached 92° C. or at approximately 30% conversion as determined by sample 0.30 part of methylene-bis-stearamide was added in the form of a finely divided dry powder. Hydroxyethyl cellulose 0.10 part was added 30 minutes after the addition of the methylene-bis-stearamide and the impeller speed increased to 110 r.p.m. After the polymerization had continued at 92° C. for the total time of 360 minutes, the temperature was raised to 115° C. for a total of 240 minutes in order to complete the polymerization. The product polymer granules were recovered from the polymerization mixture, washed and air dried. The polymerized granules were resuspended in a 100 gallon Pfaudler kettle in 100 parts of water using 0.2 part of polyoxyethylene sorbitan monolaurate and 0.05 part of hydroxyethyl cellulose as the suspending agents. Pentane, 8.0 parts, was added to the suspension and the suspension stirred for 7 hours at a temperature between 90–100° C. after which the suspension was cooled to 40° C. and the product polymer granules containing the pentane dispersed therein recovered, washed and air dried. The product granules had good antilumping (2% lumps) on pre-expansion. Blocks molded from the granules in accordance with the procedure set forth in Example II gave a foam cool time of 3–4 minutes.

In accordance with this invention a variety of homopolymers and copolymers can be prepared which are derived from vinyl aromatic monomers including styrene, divinylbenzene, vinyl toluene, isopropylstyrene, alpha-methylstyrene, nuclear dimethylstyrenes, chlorostyrene, vinylnaphthalene, etc. as well as polymers prepared by the copolymerization of a vinyl aromatic monomer with monomers such as butadiene, isobutylene, and acrylonitrile wherein the vinyl aromatic monomer is present in at least 50% by weight. For the purposes of convenience these polymers are referred to hereinafter as styrene polymers.

The production of articles having a foamed polymer structure involves generally a molding cycle that includes preheating the mold, charging the mold with expandable polymeric particles, heating the granules in the mold, and then cooling the resulting foamed structure to a temperature at which the material is self supporting and will retain its shape. The time consumed in a typical molding cycle as carried out heretofore breaks down as follows:

Preheating requires about 16% of the time of the cycle;
Filling the mold requires about 6% of the cycle;
Heating the polymeric granules requires about 2% of the cycle; and
Cooling the finished article so that it can be removed from the mold requires about 76% of the time.

By the practice of this invention expandable polymer granules can be produced which allow a startling reduction to be made in the portion of the molding cycle needed for cooling the finished article. The cooling time is reduced to about one-tenth to one-fifteenth that required using conventional expandable polymer granules. The cooling time using the product of the invention consumes only 15-20% of the mold cycle time. Since the preheating, mold filling and granule heating time remain the same, the overall mold cycle time is reduced by as much as 60%. This means that by using the product of the invention over twice as many articles can be produced from the same piece of molding equipment in a given period of time as compared with the production of articles by the use of the heretofore known expandable polymers. The savings in molding cycle time made possible by this invention is demonstrated in FIGURE 2.

We claim:
1. Method of making foamable thermoplastic polymer granules comprising the steps of:
    (a) polymerizing a vinyl aromatic monomer in an aqueous suspension in the presence of a catalytic amount of a free radical initiator until the polymerization has progressed to a point between about 16 and 95% conversion of monomer to polymer;
    (b) adding from about 0.1 to 0.75% by weight based on the monomer of an amide having the general formula:

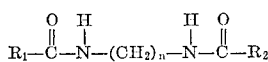

where $n$ is an integer from 1-6 and $R_1$ and $R_2$ are selected from the group consisting of alkyl and alkenyl having from 7-21 carbon atoms;
    (c) completing said polymerization;
    (d) recovering said polymer granules; and
    (e) including the step of impregnating said granules with from about 5 to 10% by weight of a blowing agent.
2. Method of claim 1 wherein the amide is added to the polymerization in the form of a finely divided dry powder.
3. Method of claim 1 wherein the amide is added to the polymerization in the form of a mixture with styrene.
4. Method of claim 1 wherein said blowing agent is selected from the group consisting of saturated aliphatic hydrocarbons having from 1-7 carbon atoms and their halogen derivatives boiling below 95° C.
5. Method of making foamable thermoplastic polymer granules which yield a fast cooling foam when molded comprising the steps of:
    (a) polymerizing a vinyl aromatic monomer in an aqueous suspension in the presence of a catalytic amount of a free radical initiator until the polymerization has progressed to a point between about 16 and 95% conversion of monomer to polymer;
    (b) adding from about 0.1 to 0.75% by weight based on the monomer of an amide having the general formula:

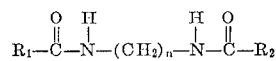

where $n$ is an integer from 1-6 and $R_1$ and $R_2$ are selected from the group consisting of alkyl and alkenyl having from 7-21 carbon atoms;
    (c) adding from 5 to 10% by weight based on the monomer of a blowing agent;
    (d) completing said polymerization; and
    (e) recovering said polymer granules.
6. Method of making foamable thermoplastic styrene polymer granules which yield a fast cooling foam when molded comprising the steps of:
    (a) copolymerizing a mixture of polymerizable monomers said mixture including at least 50% by weight of vinyl aromatic monomer in an aqueous suspension in the presence of a catalytic amount of a free radical initiator until the polymerization has progressed to a point between about 16 and 95% conversion of vinyl monomer to polymer;
    (b) adding from about 0.1 to 0.75% by weight based on monomer of an amide having the general formula:

where $n$ is an integer from 1 to 6 and $R_1$ and $R_2$ are selected from the group consisting of alkyl and alkenyl having from 7-21 carbon atoms;
    (c) completing said polymerization;
    (d) recovering said polymer granules; and
    (e) including the step of impregnating said granules with from about 5 to 10% by weight of a blowing agent.
7. Method of making expandable polystyrene polymer granules which yield a fast cooling foam when molded comprising the steps of:
    (a) polymerizing styrene monomer in an aqueous suspension in the presence of a catalytic amount of a free radical initiator until the polymerization has progressed to a point between about 16 and 95% conversion of the styrene monomer to polymer;
    (b) adding from about 0.1 to 0.75% by weight based on the monomer of an amide having the general formula:

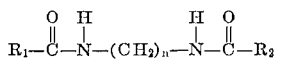

where $n$ is an integer from 1-6 and $R_1$ and $R_2$ are selected from the group consisting of alkyl and alkenyl having from 7-21 carbon atoms;
    (c) completing said polymerization;
    (d) recovering said polymer granules; and
    (e) including the step of impregnating said granules with from about 5 to 10% by weight of a blowing agent.
8. A foamable vinyl aromatic polymer composition comprising a vinyl aromatic polymer containing a blowing agent and having dispersed therein during an intermediate stage of polymerization from 0.1 to 0.75% by weight of polymer of a fatty acid bis-amide.
9. The composition of claim 8 wherein said blowing agent is an amount of from 5-10 parts per 100 parts of said composition of a volatile organic fluid selected from the group consisting of saturated aliphatic hydrocarbons having from 1–7 carbon atoms and their halogen derivatives boiling below 95° C., and said fatty acid bis-amide having the general formula:

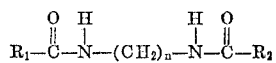

where $R_1$ and $R_2$ are alkyl or alkenyl groups each having from 7–21 carbon atoms and where $n$ is an integer from 1–6.

References Cited

UNITED STATES PATENTS

| | | | |
|---|---|---|---|
| 3,001,954 | 9/1961 | Buchholz et al. | 260—2.5 |
| 3,046,236 | 7/1962 | Jahn | 260—2.5 |
| 3,058,929 | 10/1962 | Vanderhoff et al. | 260—2.5 |
| 3,165,492 | 1/1965 | Tholstrup et al. | 260—32.6 |

GEORGE F. LESMES, *Primary Examiner.*

SAMUEL H. BLECH, MURRAY TILLMAN,
*Examiners.*

W. J. BRIGGS, Sr., *Assistant Examiner.*